United States Patent
Rivera

(10) Patent No.: US 7,150,126 B2
(45) Date of Patent: Dec. 19, 2006

(54) SLIDING WINDOW TRACK SYSTEM

(75) Inventor: Luis Rivera, Humble, TX (US)

(73) Assignee: Texas Stairs and Rails, Inc., Houston, TX (US)

( * ) Notice: Subject to any disclaimer, the term of this patent is extended or adjusted under 35 U.S.C. 154(b) by 91 days.

(21) Appl. No.: 10/632,264

(22) Filed: Jul. 31, 2003

(65) Prior Publication Data

US 2005/0076573 A1   Apr. 14, 2005

Related U.S. Application Data

(60) Provisional application No. 60/400,927, filed on Aug. 1, 2002.

(51) Int. Cl.
*E05C 7/00* (2006.01)
(52) U.S. Cl. .................. 49/62; 49/63; 49/408; 49/413; 49/453; 52/204.595
(58) Field of Classification Search .............. 49/61, 49/62, 63, 125, 404, 408, 413, 453; 52/204.51, 52/204.593, 204.595, 204.6, 204.71
See application file for complete search history.

(56) References Cited

U.S. PATENT DOCUMENTS

| | | | | |
|---|---|---|---|---|
| 1,866,882 A * | 7/1932 | Dixson | ............... | 160/40 |
| 2,504,204 A * | 4/1950 | Augustine | ............... | 52/204.599 |
| 2,918,706 A * | 12/1959 | Rust et al. | ............... | 49/408 |
| 3,184,801 A * | 5/1965 | Fletcher | ............... | 49/459 |
| 3,570,182 A * | 3/1971 | Bakke | ............... | 49/408 |
| 3,636,661 A * | 1/1972 | Strawsine | ............... | 49/413 |
| 3,808,742 A * | 5/1974 | Ehret et al. | ............... | 49/413 |
| 3,908,730 A * | 9/1975 | Goss et al. | ............... | 160/90 |
| 4,004,629 A * | 1/1977 | Kelly | ............... | 160/90 |
| 4,087,509 A * | 5/1978 | Gates | ............... | 264/295 |
| 4,187,642 A * | 2/1980 | Morinaga et al. | ............... | 49/406 |
| 4,553,361 A * | 11/1985 | Ralph | ............... | 52/209 |
| 4,599,836 A * | 7/1986 | Melcher | ............... | 52/202 |
| 5,740,639 A * | 4/1998 | Covington | ............... | 52/202 |

\* cited by examiner

*Primary Examiner*—Gregory J. Strimbu
(74) *Attorney, Agent, or Firm*—Gary L. Bush; Andrews Kurth LLP

(57) ABSTRACT

Upper and lower window track strips each define an elongate panel receptacle of generally rectangular configuration for receiving an edge portion of a structural panel in tight fitting serration retained relation therein. The upper and lower window track strips define wall structures forming a pair of upper and lower window guide tracks, respectively, thereby allowing a pair of window panes to be moved in sliding fashion between the upper and lower guide tracks to open or close the windows. The upper window guide tracks are deeper than the lower window guide tracks to permit the window panes to be moved upwardly and laterally for removal. Rainwater collected within the lower guide tracks drains at the ends of the lower guide tracks or via drain holes therein. The lower window track strip is provided with a resilient cushion strip to protect objects such as guns, camera lenses and the like that contact the lower window track strip.

8 Claims, 1 Drawing Sheet

SLIDING WINDOW TRACK SYSTEM

RELATED APPLICATION

Applicant hereby claims priority in U.S. Provisional Application No. 60/400,927, filed on Aug. 1, 2002 by Luis Rivera and entitled "Sliding Window Track System" which Provisional Application is incorporated by reference herein for all purposes.

BACKGROUND OF THE INVENTION

1. Field of the Invention

The present invention relates generally to sliding windows for structures and more particularly to upper and lower tracks for sliding windows. Even more specifically the present invention concerns extruded metal window strips that are designed with receptacles for receiving structural panels in tight fitting retained engagement therein and presenting external window tracks for sliding overlapping windows and providing for drainage of rain water that might enter the window tracks.

2. Description of the Prior Art

SUMMARY OF THE INVENTION

It is a principal feature of the present invention to provide a novel window strip for sliding windows and which defines a panel receptacle of generally rectangular cross-section for receiving edge portions of structural panels to which the window strip is affixed;

It is also a feature of the present invention to provide a novel window strip for sliding windows having a panel receptacle of generally rectangular cross-section, with internal serrations in the form of hook-like ridges and grooves for establishing retention of the window strip to edge portions of structural panels to which the window strip is affixed;

It is another feature of the present invention to provide a novel window strip for sliding overlapping, horizontally moveable window panels and which defines multiple internal serrations for establishing gripping or retaining relation with the edge portions of structural panels;

It is also a feature of the present invention to provide novel upper and lower window strips for retaining sliding overlapping, horizontally moveable window panels, with the window strips forming upper and lower window sills for defining a window opening;

It is another feature of the present invention to provide a novel window strip for lower window sill having a receptacle receiving and securing a strip of resilient rubber or rubber-like cushioning material for cushioning objects that might be positioned in resting relation on the lower window sill of a window opening:

It is an even further feature of the present invention to provide novel upper and lower window strips for sliding overlapping, horizontally moveable window panels, with the window strips each defining a pair of individual window slide tracks permitting window panels to be moved substantially horizontally, without rubbing on one another during such movement;

It is a principal feature of the present invention to provide a novel window strip for sliding windows and which each define slide tracks for window panels and which can be spaced with respect to the dimension of the window panels to permit the window panels to be raised from an operative position to a release position to clear the window slide tracks of the lower window strip and thus permit removal of the window panels;

Briefly, the various objects and features of the present invention are realized through the provision of upper and lower window strips which are preferably extruded from a metal material such as aluminum alloy. Each of the top and bottom window strips defines an elongate panel receptacle of generally rectangular configuration, with a multiplicity of serrations being defined within the wall surfaces that define the elongate panel receptacle. An edge portion of a structural panel, such as a sheet of plywood, pressed wood, or plastic material is received in tight fitting relation within the elongate panel receptacle, with the serrations engaging within the structural panel material and securing the window track or strip to the structural panel. Screws or other connecting devices may be employed to positively secure the window tract structures of the structural panels if desired.

The window track strips each define wall structures forming a pair of window guide tracks thereby allowing a pair of window panels to be positioned in closely spaced but not touching relation and allowing the window panels to be moved in sliding fashion along the guide tracks to open or close the windows. The top window track strip defines window guide tracks that are of greater internal dimension or deeper as compared to the internal dimension of the window guide tracks of the bottom window track strip. With the structural panels properly spaced, thus properly spacing the top and bottom window guide tracks with respect to the dimension of the window panels, the window panels are normally positioned by gravity at the bottom of the bottom window guide tracks. The deeper window guide tracks of the upper window track strip permit the window panels to be upwardly so that the bottom edges thereof will clear the wall structure of the walls that define the bottom window guide track. When this release window position is achieved the bottom part of the window panels may be moved laterally to clear the track walls and the window panel may be removed. This feature will allow the windows of the structure to be rendered fully open if desired.

In the event rainwater should enter the guide tracks it will drain away at the ends of the window guide tracks. Alternatively, the window guide track structure may be drilled at proper locations to define drain holes to permit water to be drained away and to permit sand, dirt and other debris to be removed from the guide tracks.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

IN THE DRAWINGS

Figure 1:
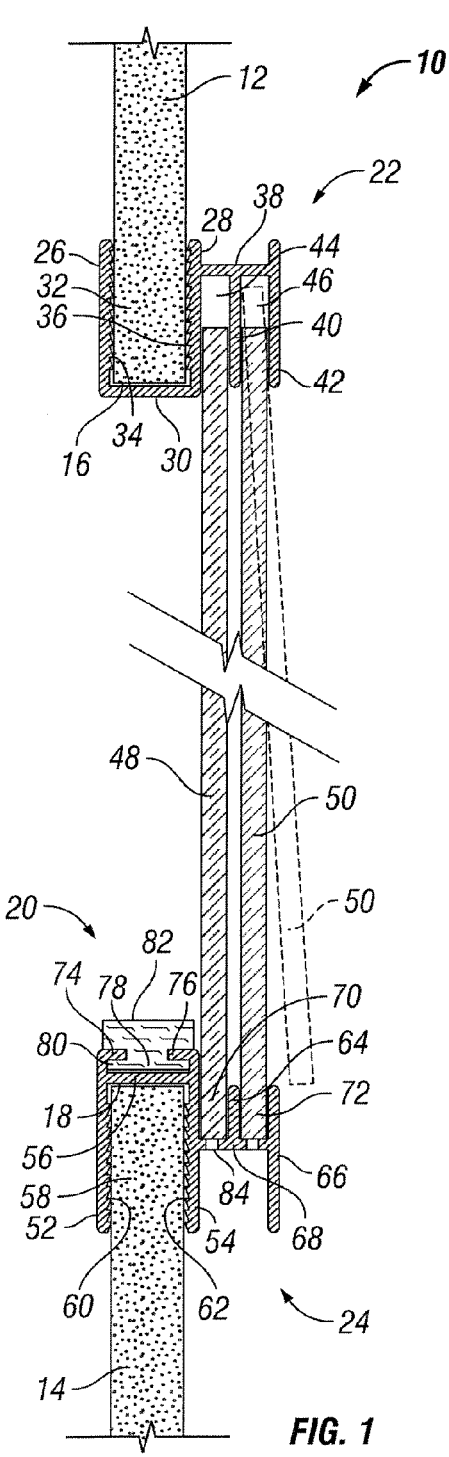
Figure 2A:
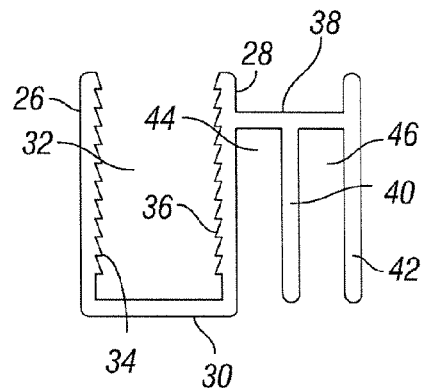
Figure 2B:
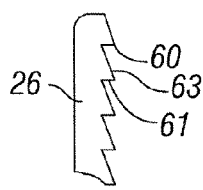
Figure 3:
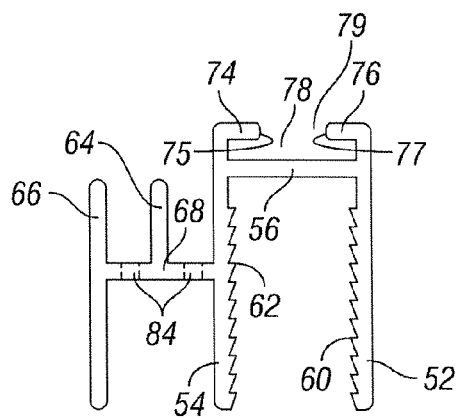
Figure 4:
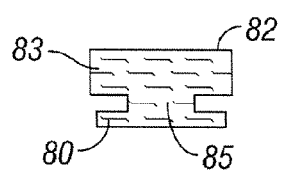

FIG. 1 is a sectional view showing part of a structure defined by structural panels and forming a window opening and with a window assembly defined by window strips constructed according to the principles of the present invention being assembled to the structural panels and having window guide tracts permitting sliding of window panels therein and with a cushioning strip being in assembly with the lower window strip and further showing the release position of one of the window panels in broken line;

FIG. 2A is a side view of a top window strip or track embodying the principles of the present invention;

FIG. 2B is an enlarged fragmentary side view, showing a portion of the side wall structure of FIG. 2A and showing the substantially horizontal internal serrations of the panel receptacle of FIG. 2A in greater detail;

FIG. 3 is a side view of a bottom window strip or track embodying the principles of the present invention; and FIG. 4 is a sectional view of a resilient insert strip of cushioning material adapted for assembly within the strip retention receptacle of the bottom window track structure of FIG. 3 and also shown at the bottom part of FIG. 1.

DETAILED DESCRIPTION OF PREFERRED EMBODIMENT

Referring now to the drawings and first to FIG. 1, the vertical sectional view of a structure, such as a deer blind or walled enclosure, shown generally at 10 comprises a pair of structural panels 12 and 14 which may be composed of plywood sheets or sheets of plastic or any other suitable material which defines substantially straight edges 16 and 18. When the panels 12 and 14 are properly located to define a window opening 20 the opposed straight edges 16 and 18 of the structural panels will have predetermined spacing.

Top and bottom window track strips, shown generally at 22 and 24 are affixed to respective edge portions of the structural panels 12 and 14 as shown. The top window track strip 22 is preferably extruded of a metal material such as aluminum alloy, but may be composed of polymer material or any of a number of other suitable materials if desired, and has receptacle side walls 26 and 28 and a receptacle bottom wall 30 which cooperatively define an upper panel receptacle 32 which received the lower edge of the upper panel 12 in close fitting relation therein. At least one and preferably both of the receptacle side walls 26 and 28 are provided with internal serrations 34 and 36 which are so spaced as to have close fitting or interference fitting relation with opposed surfaces of the structural panels and thus bite into the structural panel material and thus provide for retention of the panel within the receptacle 32 or alternatively provide for retention of the window track strip in assembly with the lower panel edge. As shown in FIG. 2B, the internal serrations are generally horizontally oriented and are each defined by intersecting generally horizontal surfaces 61 and angulated surfaces 63. The serrations are oriented to permit forcible assembly of the top and bottom window track strips to the structural panels and to resist separation therefrom after assembly. If additional retention of the upper window track strip in assembly with the panel edge is needed, the window track strip material may be drilled and screws, nails or other retaining devices may be extended through the window track strip material and fixed into the structural panel material.

The top window track strip 22 defines an integral horizontally oriented support wall or member 38 which projects laterally from the receptacle side wall 28 and provides support for guide walls 40 and 42 that define window guide tracks 44 and 46. These guide tracks will typically be oriented substantially vertically, though other character of orientation may be employed as well. The upper edges of a pair of window panels 48 and 50 are adapted to be received in guided moveable relation within the guide tracks 44 and 46, thus permitting edges of the window panels to be disposed in overlapping relation when the window panels are in their closed positions, and permitting either of the window panels to be moved toward the open or closed positions by substantially horizontal sliding movement within the respective window panel guide track.

The bottom window track strip 24 also defines receptacle side walls 52 and 54 and a receptacle top wall 56 that collectively define a panel receptacle 58 which receives the upper edge portion of the structural panel 14. The receptacle side walls 52 and 54 also define internal serrations 60 and 62 for the same purpose as the internal serrations 34 and 36 as discussed above. The bottom window track strip 24 also defines receptacle walls 64 and 66 which cooperate with a horizontal support wall 68 to define window panel guide tracks 70 and 72 which receive and guide the bottom edges of the window panels 48 and 50. Both of the top and bottom window panel guide tracks provide for guiding of the window panels during sliding movement therefor and support the window panels in closely spaced overlapping, but not touching, relation with one another.

The upper portion of the bottom window track strip 24 defines opposed, generally horizontally oriented retainer wall sections 74 and 76 which have wall ends 75 and 77, respectively, defining an opening 79 therebetween. The opposed, generally horizontally oriented retainer wall sections 74 and 76 are disposed define a generally rectangular retainer receptacle 78 for receiving the generally rectangular bottom flange portion 80 of a resilient cushioning strip 82. The resilient cushioning strip 82 also defines a generally rectangular cushioning cap 83 which establishes a protective rest for various objects. An integral web 85 interconnects the generally rectangular bottom flange portion 80 and the generally rectangular cushioning cap 83. When the resilient cushioning strip is in assembly with the generally rectangular retainer receptacle 78, the integral web 85 will be located the opening 79, between the opposed retainer wall sections 74 and 76. Though described as generally rectangular herein, it is not intended to restrict the spirit scope of the present invention to a generally rectangular retainer receptacle 78 or resilient cushioning strips having components of generally rectangular configuration, it being within the scope of the present invention to employ resilient cushioning strip and cushioning strip retention components of any other suitable configuration.

The resilient cushioning strip is composed of a rather soft rubber or rubber-like material such as SantoPrene or EPDM or any other suitable cushioning material. The resilient cushioning material may have a durometer in the range of from about 50 to 90 to be sufficient for protection of guns, camera lenses, telescopes and other objects that may be used within the windowed enclosure. Thus, when the panel structure constitutes a shooting blind, photography blind or the like, a rifle, camera or a telescope being used is protected against being scratched when it is rested on the bottom window guide track structure.

To permit drainage of water from the lower window guide tracks 70 and 72 one or more drain holes 84 may be drilled in the support wall 68. However, water will also drain from the respective ends of the window guide strips. If such holes are drilled or otherwise formed, debris such as sand, dirt and the like may also be removed from the window guide tracks via the holes. The window panels may also be removed simply by raising them upwardly and moving the bottom edges of the window panels outwardly. The lower guide track has a predetermined depth that is determined by the height of the guide track walls 64 and 66 above the horizontal support wall. Thus, raising of the window panels a distance slightly greater than the height of the guide track walls 64 and 66 will orient the bottom edge of the window panel or panels above the guide track walls. To permit such raising movement of the window panels, the upper guide tracks 44 and 46 are deeper than the lower guide tracks 70 and 72 by a distance exceeding the height of the guide track walls 64 and 66. When the window panels are supported by the horizontal support wall 68 the upper edges of the window panels will be spaced a sufficient distance below the horizontal wall 38 that the window panels are permitted upward movement by a distance greater than the height of the lower guide track walls 64 and 66, clearing the bottom edges of the window panels from the top edges of the lower guide track walls 64 and 66. Thus, when the window panels are at their operative positions within the guide tracks of the top and bottom window guide tracks the bottom of each window panel will rest on the transverse support wall 68 and the top edges of each of the window panels will be spaced from the horizontal support wall 38 as shown in FIG. 1. To remove a window panel, the window panel is lifted within the respective receptacle 44 or 46 of the top window track structure sufficiently to cause the bottom edge of the window panel to clear the respective guide wall 64 or 66. When this is done, as shown in broken line in FIG. 1, the bottom edge of the window panel can be moved laterally, causing the top of the window panel to essentially pivot within the upper guide track or receptacle 44 or 46. With the lower edge of the window panel so positioned, it may then be moved downwardly, thus extracting its upper edge from the respective upper guide track. Insertion of the window panels into guided relation with respect to the guide track structures is achieved with just the opposite movement. In such case the upper edges of the window panels are inserted into the upper guide tracks 44 and 46, then the window panels are moved upwardly within the upper guide tracks sufficiently to cause the lower edges of the window panels to clear the respective lower guide track walls 64 and 66. The lower edges of the window panels are then moved into registry with the respective lower guide track and the window panels are then released, allowing their movement by gravity to the positions shown in full line in FIG. 1.

In view of the foregoing it is evident that the present invention is one well adapted to attain all of the objects and features herein above set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A window track assembly for attachment of first and second window panes (48, 50) to an upper structural panel (12) and to a lower structural panel (14), said upper structural panel and said lower structural panel generally lying in a common vertical plane, said upper structural panel having a lower edge, said lower structural panel having an upper edge, said lower edge and said upper edge defining a window opening therebetween, the window track assembly comprising:

a first window track strip (22) including a first side wall (26), a second side wall (28) and a transverse wall (30) connected therebetween which define an edge-receiving receptacle (32) having an opening facing a first direction and adapted for receiving said lower edge of said upper structural panel;

a first guide track structure (38, 40, 42) extending transversely away from said second side wall and said first side wall (28) of said edge-receiving receptacle of said first window track strip and defining first and second window slide track receptacles (44, 46) having openings facing a second direction opposite to said first direction;

a second window track strip (24) including a first side wall (52), a second side wall (54) and a transverse wall (56) connected therebetween which define an edge-receiving receptacle (58) having an opening facing a third direction and adapted for receiving said upper edge of said lower structural panel;

a second guide track structure (64, 66, 68) extending transversely away from said first and second side wall (54) of said edge-receiving receptacle of said second window track strip and defining first and second window slide track receptacles (70, 72) having openings facing a fourth direction opposite said third direction; and a resilient member (82) connected to and substantially covering the entire surface of said transverse wall of said second window track strip that faces said fourth direction;

whereby when said edge-receiving receptacle of said first window track strip receives said lower edge of said upper structural panel and said edge-receiving receptacle of said second window track strip receives said upper edge of said lower structural panel, said first direction and said fourth direction are the same, said second direction and said third direction are the same, and said first and second window track strips cooperate to capture and support said first and second window panes for sliding movement along said first and second guide track structures.

2. The window track assembly of claim 1, wherein:

said first and second window slide track receptacles of said second guide track structure each have a first depth; and said first and second window slide track receptacles of said first guide track structure each have a greater depth than said first depth.

3. The window track assembly of claim 1, wherein:

said first and second side walls of said first window track strip each include an inner face designed and arranged to abut said lower edge of said upper structural panel; and said first and second side walls of said second window track strip each include an inner face designed and arranged to abut said upper edge of said lower structural panel.

4. The window track assembly of claim 3, wherein:

each of said inner faces of said first and second side walls of said first window track strip are characterized by having serrations designed and arranged to engage and retain said lower edge of said upper structural panel within said edge-receiving receptacle of said first window track strip, and each of said inner faces of said first and second side walls of said second window track strip are characterized by having serrations designed and arranged to engage and retain said upper edge of said lower structural panel within said edge-receiving receptacle of said second window track strip.

5. The window track assembly of claim 1, wherein: said first guide track structure includes generally parallel first and second guide walls (40, 42) which are coupled to said second side wall (28) of said first window track strip by a support wall (38) extending generally perpendicular from said second side wall of said first window track strip; and said second guide track structure includes generally parallel first and second guide walls which are coupled to said second side wall (54) of said second window track strip by a support wall (68) extending generally perpendicular from said second side wall of said second window track strip.

6. The window track assembly of claim 1, further comprising:

a channel having an opening facing in said fourth direction from said transverse wall of said second window track strip, said channel being designed and arranged to capture said resilient member.

7. A window track assembly for attachment to upper and lower structural panels (12, 14), said upper structural panel and said lower structural panel generally lying in a common vertical plane and defining a window opening, comprising:

an upper window track strip (22) defining an upward-facing edge-receiving receptacle (32) for receiving therein a lower edge of said upper structural panel;

an upper guide track structure extending transversely from said upper window track strip and defining a downward-facing window slide track receptacle (44, 46);

a lower window track strip (24) defining a downward-facing edge-receiving receptacle (58) for receiving therein an upper edge of said lower structural panel;

a resilient member (82) connected to and substantially covering the entire upper surface of said downward-facing edge-receiving receptacle of said lower window track strip;

a lower guide track structure member extending transversely away from vertical side members of said downward-facing edge-receiving receptacle and defining an upward-facing window slide track receptacle (70, 72), an uppermost extent of said lower guide track structure member being disposed at an elevation lower than said upper surface, said lower guide track structure member being disposed laterally with respect to said downward-facing edge receiving receptacle; and a first window panel (48) being located and slideably supported within said downward-facing window slide track receptacle and within said upward-facing window slide track receptacle.

8. The window track assembly of claim 7, further comprising:

a first divider wall (40) disposed within said downward-facing window slide track receptacle defining first and second slots (44, 46);

a second divider wall (64) disposed within said upward-facing window slide track receptacle defining third and fourth slots (70,72);

said first window panel disposed within said first slot of said downward-facing window slide track receptacle and within said third slot of said upward-facing window slide track receptacle, and a second window panel (50) disposed within said second slot of said downward-facing window slide track receptacle and within said fourth slot of said upward-facing window slide track receptacle, said first window panel being maintained from contact with said second window panel by said first divider wall and said second divider wall.

* * * * *